US007802144B2

(12) United States Patent
Vinberg et al.

(10) Patent No.: US 7,802,144 B2
(45) Date of Patent: *Sep. 21, 2010

(54) MODEL-BASED SYSTEM MONITORING

(75) Inventors: Anders B. Vinberg, Kirkland, WA (US); Anand Lakshminarayanan, Redmond, WA (US); Ashvinkumar J. Sanghvi, Sammamish, WA (US); Vij Rajarajan, Issaquah, WA (US); Vitaly Voloshin, Issaquah, WA (US); Bassam Tabbara, Seattle, WA (US); Kevin Grealish, Seattle, WA (US); Rob Mensching, Redmond, WA (US); Geoffrey Outhred, Seattle, WA (US); Galen C. Hunt, Bellevue, WA (US); Aamer Hydrie, Seattle, WA (US); Robert V. Welland, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 840 days.

This patent is subject to a terminal disclaimer.

(21) Appl. No.: 11/107,419

(22) Filed: Apr. 15, 2005

(65) Prior Publication Data

US 2006/0235650 A1 Oct. 19, 2006

(51) Int. Cl.
*G06F 11/00* (2006.01)
(52) U.S. Cl. .............................. 714/37; 714/25; 714/47; 714/48; 455/423
(58) Field of Classification Search .................. 714/47, 714/48; 455/423
See application file for complete search history.

(56) References Cited

U.S. PATENT DOCUMENTS

| 4,200,770 | A | 4/1980 | Hellman et al. |
|---|---|---|---|
| 4,218,582 | A | 8/1980 | Hellman et al. |
| 4,405,829 | A | 9/1983 | Rivest et al. |
| 4,424,414 | A | 1/1984 | Hellman et al. |
| 5,031,080 | A | 7/1991 | Liu et al. |
| 5,220,621 | A | 6/1993 | Saitoh |
| 5,430,810 | A | 7/1995 | Saeki |
| 5,490,276 | A | 2/1996 | Doli, Jr. et al. |
| 5,495,610 | A | 2/1996 | Shing et al. |
| 5,499,357 | A | 3/1996 | Sonty et al. |
| 5,504,921 | A | 4/1996 | Dev et al. |
| 5,557,774 | A | 9/1996 | Shimabukuro et al. |
| 5,579,482 | A | 11/1996 | Einkauf et al. |
| 5,668,995 | A | 9/1997 | Bhat |

(Continued)

FOREIGN PATENT DOCUMENTS

CN    1368694    9/2002

(Continued)

OTHER PUBLICATIONS

Burns et al., "Allocation and Data Placement using Virtual Contiguity", pp. 6.

(Continued)

*Primary Examiner*—Bryce P Bonzo
*Assistant Examiner*—Jeison C Arcos
(74) *Attorney, Agent, or Firm*—Lee & Hayes, PLLC

(57) ABSTRACT

Model-based system monitoring includes identifying multiple monitors configured to monitor multiple components in a system, and accessing multiple health models associated with the multiple monitors. A monitoring policy is generated to monitor the system. The monitoring policy is derived, at least in part, from the multiple health models.

12 Claims, 6 Drawing Sheets

U.S. PATENT DOCUMENTS

| | | | |
|---|---|---|---|
| 5,686,940 A | 11/1997 | Kuga | |
| 5,748,958 A | 5/1998 | Badovinatz et al. | |
| 5,758,351 A | 5/1998 | Gibson et al. | |
| 5,768,271 A | 6/1998 | Seid et al. | |
| 5,774,689 A | 6/1998 | Curtis et al. | |
| 5,784,463 A | 7/1998 | Chen et al. | |
| 5,790,895 A | 8/1998 | Krontz et al. | |
| 5,818,937 A | 10/1998 | Watson et al. | |
| 5,822,531 A | 10/1998 | Gorczyca et al. | |
| 5,826,015 A | 10/1998 | Schmidt | |
| 5,845,124 A | 12/1998 | Berman | |
| 5,845,277 A | 12/1998 | Pfeil et al. | |
| 5,867,706 A | 2/1999 | Martin et al. | |
| 5,878,220 A | 3/1999 | Olkin et al. | |
| 5,895,499 A | 4/1999 | Chu | |
| 5,905,728 A | 5/1999 | Han et al. | |
| 5,917,730 A | 6/1999 | Rittie et al. | |
| 5,930,798 A | 7/1999 | Lawler et al. | |
| 5,958,009 A | 9/1999 | Friedrich et al. | |
| 5,968,126 A | 10/1999 | Ekstrom et al. | |
| 6,035,405 A | 3/2000 | Gage et al. | |
| 6,041,054 A | 3/2000 | Westberg | |
| 6,047,323 A | 4/2000 | Krause | |
| 6,049,528 A | 4/2000 | Hendel et al. | |
| 6,052,469 A | 4/2000 | Johnson et al. | |
| 6,059,842 A | 5/2000 | Dumarot et al. | |
| 6,065,058 A | 5/2000 | Hailpern et al. | |
| 6,075,776 A | 6/2000 | Tanimoto et al. | |
| 6,076,108 A | 6/2000 | Courts et al. | |
| 6,081,826 A | 6/2000 | Masuoka et al. | |
| 6,085,238 A | 7/2000 | Yuasa et al. | |
| 6,108,702 A | 8/2000 | Wood | |
| 6,115,393 A | 9/2000 | Engel et al. | |
| 6,118,785 A | 9/2000 | Araujo et al. | |
| 6,125,447 A | 9/2000 | Gong | |
| 6,134,594 A | 10/2000 | Helland et al. | |
| 6,147,995 A | 11/2000 | Dobbins et al. | |
| 6,151,688 A | 11/2000 | Wipfel et al. | |
| 6,167,052 A | 12/2000 | McNeill et al. | |
| 6,167,383 A | 12/2000 | Henson | |
| 6,178,529 B1 | 1/2001 | Short et al. | |
| 6,182,275 B1 | 1/2001 | Beelitz et al. | |
| 6,192,401 B1 | 2/2001 | Modiri et al. | |
| 6,195,091 B1 | 2/2001 | Harple et al. | |
| 6,195,355 B1 | 2/2001 | Demizu | |
| 6,208,345 B1 | 3/2001 | Sheard et al. | |
| 6,208,649 B1 | 3/2001 | Kloth | |
| 6,209,099 B1 | 3/2001 | Saunders | |
| 6,212,559 B1 | 4/2001 | Bixler et al. | |
| 6,230,312 B1 | 5/2001 | Hunt | |
| 6,236,365 B1 | 5/2001 | LeBlanc et al. | |
| 6,236,901 B1 | 5/2001 | Goss | |
| 6,237,020 B1 | 5/2001 | Leymann et al. | |
| 6,253,230 B1 | 6/2001 | Couland et al. | |
| 6,259,448 B1 | 7/2001 | McNally et al. | |
| 6,263,089 B1 | 7/2001 | Otsuka et al. | |
| 6,266,707 B1 | 7/2001 | Boden et al. | |
| 6,269,076 B1 | 7/2001 | Shamir et al. | |
| 6,269,079 B1 | 7/2001 | Marin et al. | |
| 6,304,972 B1 | 10/2001 | Shavit | |
| 6,305,015 B1 | 10/2001 | Akriche et al. | |
| 6,311,144 B1 | 10/2001 | Abu El Ata | |
| 6,311,270 B1 | 10/2001 | Challener et al. | |
| 6,330,605 B1 | 12/2001 | Christensen et al. | |
| 6,336,138 B1 | 1/2002 | Caswell et al. | |
| 6,338,112 B1 | 1/2002 | Wipfel et al. | |
| 6,351,685 B1 | 2/2002 | Dimitri et al. | |
| 6,353,861 B1 | 3/2002 | Dolin, Jr. et al. | |
| 6,353,898 B1 | 3/2002 | Wipfel et al. | |
| 6,360,265 B1 | 3/2002 | Falck et al. | |
| 6,367,010 B1 | 4/2002 | Venkatram et al. | |
| 6,370,573 B1 | 4/2002 | Bowman-Amuah | |
| 6,370,584 B1 | 4/2002 | Bestavros et al. | |
| 6,377,996 B1 | 4/2002 | Lumelsky et al. | |
| 6,389,464 B1 | 5/2002 | Krishnamurthy et al. | |
| 6,393,386 B1 * | 5/2002 | Zager et al. | 703/25 |
| 6,393,456 B1 | 5/2002 | Ambler et al. | |
| 6,393,474 B1 * | 5/2002 | Eichert et al. | 709/223 |
| 6,408,390 B1 | 6/2002 | Saito | |
| 6,418,554 B1 | 7/2002 | Delo et al. | |
| 6,424,718 B1 | 7/2002 | Holloway | |
| 6,424,992 B2 | 7/2002 | Devarakonda et al. | |
| 6,427,163 B1 | 7/2002 | Arendt et al. | |
| 6,427,171 B1 | 7/2002 | Craft et al. | |
| 6,442,557 B1 | 8/2002 | Buteau et al. | |
| 6,442,713 B1 | 8/2002 | Block et al. | |
| 6,449,650 B1 | 9/2002 | Westfall et al. | |
| 6,457,048 B2 | 9/2002 | Sondur et al. | |
| 6,463,536 B2 | 10/2002 | Saito | |
| 6,470,025 B1 | 10/2002 | Wilson et al. | |
| 6,470,464 B2 | 10/2002 | Bertram et al. | |
| 6,473,791 B1 | 10/2002 | Al-Ghosein et al. | |
| 6,480,955 B1 | 11/2002 | DeKoning et al. | |
| 6,484,261 B1 | 11/2002 | Wiegel | |
| 6,502,131 B1 | 12/2002 | Vaid et al. | |
| 6,519,615 B1 | 2/2003 | Wollrath et al. | |
| 6,529,953 B1 | 3/2003 | Van Renesse | |
| 6,539,494 B1 | 3/2003 | Abramson et al. | |
| 6,546,423 B1 | 4/2003 | Dutta et al. | |
| 6,546,553 B1 | 4/2003 | Hunt | |
| 6,549,934 B1 | 4/2003 | Peterson et al. | |
| 6,564,261 B1 | 5/2003 | Gudjonsson et al. | |
| 6,570,847 B1 | 5/2003 | Hosein | |
| 6,570,875 B1 | 5/2003 | Hegde | |
| 6,574,195 B2 | 6/2003 | Roberts | |
| 6,584,499 B1 | 6/2003 | Jantz et al. | |
| 6,587,876 B1 | 7/2003 | Mahon et al. | |
| 6,597,956 B1 | 7/2003 | Aziz et al. | |
| 6,598,077 B2 | 7/2003 | Primak et al. | |
| 6,598,173 B1 | 7/2003 | Sheikh et al. | |
| 6,598,223 B1 | 7/2003 | Vrhel, Jr. et al. | |
| 6,601,101 B1 | 7/2003 | Lee et al. | |
| 6,601,233 B1 | 7/2003 | Underwood | |
| 6,606,708 B1 | 8/2003 | Devine et al. | |
| 6,609,148 B1 | 8/2003 | Salo et al. | |
| 6,609,213 B1 | 8/2003 | Nguyen et al. | |
| 6,611,522 B1 | 8/2003 | Zheng et al. | |
| 6,628,671 B1 | 9/2003 | Dynarski et al. | |
| 6,631,141 B1 | 10/2003 | Kumar et al. | |
| 6,640,303 B1 | 10/2003 | Vu | |
| 6,651,101 B1 | 11/2003 | Gai et al. | |
| 6,651,240 B1 | 11/2003 | Yamamoto et al. | |
| 6,654,782 B1 * | 11/2003 | O'Brien et al. | 709/201 |
| 6,654,796 B1 | 11/2003 | Slater et al. | |
| 6,665,714 B1 | 12/2003 | Blumenau et al. | |
| 6,671,699 B1 | 12/2003 | Black et al. | |
| 6,675,308 B1 | 1/2004 | Thomsen | |
| 6,678,821 B1 | 1/2004 | Waugh et al. | |
| 6,678,835 B1 * | 1/2004 | Shah et al. | 714/4 |
| 6,681,262 B1 | 1/2004 | Rimmer | |
| 6,691,148 B1 | 2/2004 | Zinky et al. | |
| 6,691,165 B1 | 2/2004 | Bruck et al. | |
| 6,691,168 B1 | 2/2004 | Bal et al. | |
| 6,694,436 B1 | 2/2004 | Audebert | |
| 6,701,363 B1 | 3/2004 | Chiu et al. | |
| 6,717,949 B1 | 4/2004 | Boden et al. | |
| 6,718,379 B1 | 4/2004 | Krishna et al. | |
| 6,725,253 B1 | 4/2004 | Okano et al. | |
| 6,728,885 B1 | 4/2004 | Taylor et al. | |
| 6,738,736 B1 | 5/2004 | Bond | |
| 6,741,266 B1 | 5/2004 | Kamiwada et al. | |
| 6,742,020 B1 | 5/2004 | Dimitroff et al. | |
| 6,748,447 B1 | 6/2004 | Basani et al. | |
| 6,754,716 B1 | 6/2004 | Sharma et al. | |

| Patent No. | Date | Name |
|---|---|---|
| 6,757,744 B1 | 6/2004 | Narisi et al. |
| 6,760,765 B1 | 7/2004 | Asai et al. |
| 6,769,008 B1 | 7/2004 | Kumar et al. |
| 6,769,060 B1 | 7/2004 | Dent et al. |
| 6,789,090 B1 | 9/2004 | Miyake et al. |
| 6,801,528 B2 | 10/2004 | Nassar |
| 6,801,949 B1 | 10/2004 | Bruck et al. |
| 6,804,783 B1 | 10/2004 | Wesinger et al. |
| 6,813,778 B1 | 11/2004 | Poli et al. |
| 6,820,042 B1 * | 11/2004 | Cohen et al. ................... 703/2 |
| 6,820,121 B1 | 11/2004 | Callis et al. |
| 6,823,299 B1 * | 11/2004 | Contreras et al. ............. 703/14 |
| 6,823,373 B1 | 11/2004 | Pancha et al. |
| 6,823,382 B2 | 11/2004 | Stone |
| 6,829,639 B1 * | 12/2004 | Lawson et al. ............... 709/224 |
| 6,829,770 B1 | 12/2004 | Hinson et al. |
| 6,853,841 B1 | 2/2005 | St. Pierre |
| 6,854,069 B2 * | 2/2005 | Kampe et al. ................... 714/4 |
| 6,856,591 B1 | 2/2005 | Ma et al. |
| 6,862,613 B1 | 3/2005 | Kumar et al. |
| 6,868,062 B1 | 3/2005 | Yadav et al. |
| 6,868,454 B1 | 3/2005 | Kubota et al. |
| 6,879,926 B2 | 4/2005 | Schmit et al. |
| 6,888,807 B2 | 5/2005 | Heller et al. |
| 6,898,791 B1 | 5/2005 | Chandy et al. |
| 6,904,458 B1 | 6/2005 | Bishop et al. |
| 6,907,395 B1 | 6/2005 | Hunt et al. |
| 6,912,568 B1 | 6/2005 | Nishiki et al. |
| 6,915,338 B1 | 7/2005 | Hunt et al. |
| 6,928,482 B1 | 8/2005 | Ben Nun et al. |
| 6,944,183 B1 | 9/2005 | Iyer et al. |
| 6,944,759 B1 | 9/2005 | Crisan |
| 6,947,987 B2 | 9/2005 | Boland |
| 6,954,930 B2 | 10/2005 | Drake et al. |
| 6,957,186 B1 | 10/2005 | Guheen et al. |
| 6,968,291 B1 * | 11/2005 | Desai .......................... 702/182 |
| 6,968,535 B2 | 11/2005 | Stelting et al. |
| 6,968,550 B2 | 11/2005 | Branson et al. |
| 6,968,551 B2 | 11/2005 | Hediger et al. |
| 6,971,072 B1 | 11/2005 | Stein |
| 6,973,620 B2 | 12/2005 | Gusler et al. |
| 6,976,269 B1 | 12/2005 | Avery, IV et al. |
| 6,983,317 B1 | 1/2006 | Bishop et al. |
| 6,985,956 B2 | 1/2006 | Luke et al. |
| 6,986,135 B2 | 1/2006 | Leathers et al. |
| 7,003,562 B2 | 2/2006 | Mayer |
| 7,003,574 B1 | 2/2006 | Bahl |
| 7,012,919 B1 | 3/2006 | So et al. |
| 7,024,451 B2 | 4/2006 | Jorgenson |
| 7,027,412 B2 | 4/2006 | Miyamoto et al. |
| 7,028,228 B1 * | 4/2006 | Lovy et al. ..................... 714/57 |
| 7,035,786 B1 | 4/2006 | Abu El Ata et al. |
| 7,035,930 B2 | 4/2006 | Graupner et al. |
| 7,043,407 B2 | 5/2006 | Lynch et al. |
| 7,046,680 B1 | 5/2006 | McDysan et al. |
| 7,047,279 B1 | 5/2006 | Beams et al. |
| 7,050,961 B1 | 5/2006 | Lee et al. |
| 7,054,943 B1 | 5/2006 | Goldszmidt et al. |
| 7,055,149 B2 | 5/2006 | Birkholz et al. |
| 7,069,204 B1 | 6/2006 | Solden et al. |
| 7,069,480 B1 * | 6/2006 | Lovy et al. ..................... 714/57 |
| 7,072,807 B2 | 7/2006 | Brown et al. |
| 7,080,143 B2 * | 7/2006 | Hunt et al. ................... 709/224 |
| 7,089,281 B1 | 8/2006 | Kazemi et al. |
| 7,089,293 B2 | 8/2006 | Grosner et al. |
| 7,103,185 B1 | 9/2006 | Srivastava et al. |
| 7,103,874 B2 | 9/2006 | McCollum et al. |
| 7,117,158 B2 | 10/2006 | Weldon et al. |
| 7,120,154 B2 | 10/2006 | Bavant et al. |
| 7,134,122 B1 | 11/2006 | Sero et al. |
| 7,139,999 B2 | 11/2006 | Bowman-Amuah |
| 7,155,490 B1 | 12/2006 | Malmer et al. |
| 7,162,427 B1 | 1/2007 | Myrick et al. |
| 7,181,731 B2 | 2/2007 | Pace et al. |
| 7,188,335 B1 | 3/2007 | Darr et al. |
| 7,191,344 B2 | 3/2007 | Lin et al. |
| 7,191,429 B2 | 3/2007 | Brassard et al. |
| 7,197,418 B2 | 3/2007 | Fuller, III et al. |
| 7,210,143 B2 | 4/2007 | Or et al. |
| 7,275,156 B2 | 9/2007 | Balfanz et al. |
| 7,203,911 B2 | 10/2007 | Williams |
| 7,315,801 B1 | 1/2008 | Dowd et al. |
| 7,318,216 B2 | 1/2008 | Diab |
| 6,971,063 B1 | 2/2008 | Rappaport et al. |
| 7,343,601 B2 | 3/2008 | Azagury et al. |
| 7,366,755 B1 | 4/2008 | Cuomo et al. |
| 7,370,323 B2 | 5/2008 | Marinelli et al. |
| 7,376,125 B1 | 5/2008 | Hussain et al. |
| 7,386,721 B1 | 6/2008 | Vilhuber et al. |
| 7,403,901 B1 | 7/2008 | Carley et al. |
| 7,404,175 B2 | 7/2008 | Lee et al. |
| 7,406,692 B2 | 7/2008 | Halpern et al. |
| 7,409,420 B2 | 8/2008 | Pullara et al. |
| 7,464,147 B1 | 12/2008 | Fakhouri et al. |
| 7,478,381 B2 | 1/2009 | Roberts et al. |
| 7,478,385 B2 | 1/2009 | Sierer et al. |
| 7,480,907 B1 | 1/2009 | Marolia et al. |
| 7,496,911 B2 | 2/2009 | Rowley et al. |
| 7,512,942 B2 | 3/2009 | Brown et al. |
| 7,594,224 B2 | 9/2009 | Patrick et al. |
| 7,624,086 B2 | 11/2009 | Keith, Jr. |
| 7,653,187 B2 | 1/2010 | Clark et al. |
| 2001/0014158 A1 | 8/2001 | Baltzley |
| 2001/0016909 A1 | 8/2001 | Gehrmann |
| 2001/0020228 A1 | 9/2001 | Cantu et al. |
| 2001/0039586 A1 | 11/2001 | Primak et al. |
| 2001/0047400 A1 | 11/2001 | Coates et al. |
| 2001/0051937 A1 | 12/2001 | Ross et al. |
| 2002/0009079 A1 | 1/2002 | Jungck et al. |
| 2002/0010771 A1 | 1/2002 | Mandato |
| 2002/0022952 A1 | 2/2002 | Zager et al. |
| 2002/0040402 A1 | 4/2002 | Levy-Abegnoli et al. |
| 2002/0049573 A1 | 4/2002 | El Ata |
| 2002/0057684 A1 | 5/2002 | Miyamoto et al. |
| 2002/0069267 A1 | 6/2002 | Thiele |
| 2002/0082820 A1 | 6/2002 | Ferguson et al. |
| 2002/0087264 A1 | 7/2002 | Hills et al. |
| 2002/0090089 A1 | 7/2002 | Branigan et al. |
| 2002/0120761 A1 | 8/2002 | Berg |
| 2002/0131601 A1 | 9/2002 | Ninomiya et al. |
| 2002/0138551 A1 | 9/2002 | Erickson |
| 2002/0152086 A1 | 10/2002 | Smith et al. |
| 2002/0156900 A1 | 10/2002 | Marquette et al. |
| 2002/0161839 A1 | 10/2002 | Colasurdo et al. |
| 2002/0171690 A1 | 11/2002 | Fox et al. |
| 2002/0184327 A1 | 12/2002 | Major et al. |
| 2002/0188941 A1 | 12/2002 | Cicciarelli et al. |
| 2002/0194342 A1 | 12/2002 | Lu et al. |
| 2002/0194345 A1 | 12/2002 | Lu et al. |
| 2002/0194369 A1 | 12/2002 | Rawlings et al. |
| 2002/0198995 A1 | 12/2002 | Liu et al. |
| 2003/0008712 A1 | 1/2003 | Poulin |
| 2003/0009559 A1 | 1/2003 | Ikeda |
| 2003/0014644 A1 * | 1/2003 | Burns et al. ................... 713/182 |
| 2003/0028642 A1 | 2/2003 | Agarwal et al. |
| 2003/0028770 A1 | 2/2003 | Litwin, Jr. et al. |
| 2003/0041142 A1 | 2/2003 | Zhang et al. |
| 2003/0041159 A1 | 2/2003 | Tinsley et al. |
| 2003/0046615 A1 * | 3/2003 | Stone .......................... 714/47 |
| 2003/0051049 A1 | 3/2003 | Noy et al. |
| 2003/0056063 A1 | 3/2003 | Hochmuth et al. |
| 2003/0069369 A1 | 4/2003 | Belenkaya et al. |
| 2003/0101284 A1 | 5/2003 | Cabrera et al. |
| 2003/0105963 A1 | 6/2003 | Slick et al. |
| 2003/0120763 A1 | 6/2003 | Voilpano |
| 2003/0126464 A1 | 7/2003 | McDaniel et al. |

| | | | |
|---|---|---|---|
| 2003/0130833 A1 | 7/2003 | Brownell et al. | |
| 2003/0165140 A1 | 9/2003 | Tang et al. | |
| 2003/0200293 A1 | 10/2003 | Fearn et al. | |
| 2003/0204734 A1 | 10/2003 | Wheeler | |
| 2003/0214908 A1* | 11/2003 | Kumar et al. | 370/234 |
| 2003/0217263 A1 | 11/2003 | Sakai | |
| 2003/0225563 A1 | 12/2003 | Gonos | |
| 2004/0002878 A1 | 1/2004 | Maria Hinton | |
| 2004/0049365 A1 | 3/2004 | Keller et al. | |
| 2004/0049509 A1 | 3/2004 | Keller et al. | |
| 2004/0059812 A1 | 3/2004 | Assa | |
| 2004/0068631 A1 | 4/2004 | Ukeda et al. | |
| 2004/0073443 A1 | 4/2004 | Gabrick et al. | |
| 2004/0073795 A1 | 4/2004 | Jablon | |
| 2004/0078787 A1 | 4/2004 | Borek et al. | |
| 2004/0111315 A1 | 6/2004 | Sharma et al. | |
| 2004/0117438 A1 | 6/2004 | Considine et al. | |
| 2004/0117476 A1 | 6/2004 | Steele et al. | |
| 2004/0160386 A1 | 8/2004 | Michelitsch et al. | |
| 2004/0161111 A1 | 8/2004 | Sherman | |
| 2004/0261079 A1 | 12/2004 | Sen | |
| 2005/0008001 A1 | 1/2005 | Williams et al. | |
| 2005/0021742 A1 | 1/2005 | Yemini et al. | |
| 2005/0080811 A1 | 4/2005 | Speeter et al. | |
| 2005/0086502 A1* | 4/2005 | Rayes et al. | 713/189 |
| 2005/0091227 A1 | 4/2005 | McCollum et al. | |
| 2005/0097146 A1 | 5/2005 | Konstantinou et al. | |
| 2005/0102154 A1 | 5/2005 | Dodd et al. | |
| 2005/0102513 A1 | 5/2005 | Alve | |
| 2005/0138416 A1 | 6/2005 | Qian et al. | |
| 2005/0152270 A1 | 7/2005 | Gomez Paredes et al. | |
| 2005/0193103 A1 | 9/2005 | Drabik | |
| 2005/0257244 A1 | 11/2005 | Joly et al. | |
| 2005/0268325 A1 | 12/2005 | Kuno et al. | |
| 2006/0025984 A1 | 2/2006 | Papaefstathiou et al. | |
| 2006/0025985 A1 | 2/2006 | Vinberg et al. | |
| 2006/0048017 A1* | 3/2006 | Anerousis et al. | 714/47 |
| 2006/0155708 A1 | 7/2006 | Brown et al. | |
| 2006/0161879 A1 | 7/2006 | Lubrecht et al. | |
| 2006/0161884 A1 | 7/2006 | Lubrecht et al. | |
| 2006/0232927 A1 | 10/2006 | Vinberg et al. | |
| 2006/0235664 A1 | 10/2006 | Vinberg et al. | |
| 2007/0006177 A1 | 1/2007 | Aiber et al. | |
| 2007/0192769 A1 | 8/2007 | Mimura et al. | |

FOREIGN PATENT DOCUMENTS

| | | |
|---|---|---|
| CN | 1375685 | 10/2002 |
| EP | 0964546 | 12/1999 |
| EP | 1180886 A1 | 2/2002 |
| EP | 1307018 A1 | 5/2003 |
| EP | 1550969(A2) | 7/2005 |
| JP | 62509656(A) | 9/1994 |
| JP | 10124343(A) | 5/1998 |
| JP | 10150470 A | 6/1998 |
| JP | 10240576(A) | 9/1998 |
| JP | 10285216 A | 10/1998 |
| JP | 11007407 | 1/1999 |
| JP | 11340980 A | 12/1999 |
| JP | 2000151574(A) | 5/2000 |
| JP | 2000293497 A | 10/2000 |
| JP | 2001339437 A | 12/2001 |
| JP | 2001526814 | 12/2001 |
| JP | 2002354006 A | 12/2002 |
| JP | 2003030424(A) | 1/2003 |
| JP | 2005155729 | 6/2005 |
| KR | 10-2002-0026751 | 4/2002 |
| KR | 10-2004-0008275 | 1/2004 |
| RU | 2111625 C1 | 5/1998 |
| RU | 2156546 C2 | 9/2000 |
| RU | 2189072 C2 | 9/2002 |
| WO | WO9853410 | 11/1998 |
| WO | WO9930514 A2 | 6/1999 |
| WO | WO9963439 | 12/1999 |
| WO | WO0022526 | 4/2000 |
| WO | WO0031945 | 6/2000 |
| WO | WO0230044 A2 | 4/2002 |
| WO | WO0237748 | 5/2002 |
| WO | WO0285051 | 10/2002 |
| WO | WO03027876 A1 | 4/2003 |
| WO | WO03039104 | 5/2003 |
| WO | WO0073929 | 12/2007 |

OTHER PUBLICATIONS

Chunxiao, et al., "Configure and move the e-Commerce Business Model by Utilizing XML", Applications of Computer Systems, No. 2, pp. 4.

Vadim, "On Virtual Data Centers and Their Operating Environments", Computer Systems and Technology Laboratory, Mar. 8, 2001, pp. 20.

Yuhui, "e-Commerce Based on ERP for Enterprize by Utilizing DNA and XML", Computer Engineering, vol. 27, No. 6, pp. 3.

Official Notice of Rejection for China Patent Application No. 200410088250.1 Mailed on Apr. 27, 2007, pp. 3.

Chunxiao, et al., Configure and move the e-Commerce Business Model by Utilizing XML, Applications of Computer Systems, No. 2, p. 8-11.

Yuhui, e-Commerce Based on ERP for Enterprize by Utilizing DNA and XML, Computer Engineering, vol. 27, No. 6, p. 165, 166, 182.

Chen, et al., "Performance Prediction of Component-based Applications", Journal of Systems and Software, vol. 74, Issue 1, Jan. 2005, pp. 1-12.

Dekhil, et al., "Generalized Policy Model for Application and Service Management", Hewlett-Packard Laboratories, Software Technology Lab, 1999, 3 pages.

Garschhammer, et al., "Towards generic Service Management Concepts A Service Model Based Approach", 2001, 14 pages.

Harbour, et al., "MAST An Open Environment for Modeling, Analysis, and Design of Real-Time Systems", 2002, pp. 1-16.

Hardwick, et al., "Modeling the Performance of E-Commerce Site", Jan. 6, 2007, Journal of Computer Resource Management, 2002, pp. 1-11.

"Integrated Security Management", Open PMF (Policy Management Framework), retrieved as early as Apr. 23, 2007 from http://www.objectsecurity.com/doc/openpmf-A4.pdf, 2 pages.

Kounev, "A Capacity Planning Methodology for Distributed E-Commerce Applications", Jan. 2, 2001, pp. 1-13.

Mahon, "OpenView PolicyXpert: Heterogeneous Configuration and Control", OpenView Policy-Based Network Management, Feb. 1999, 4 pages.

Norton, "Simalytic Hybrid Modeling Planning the Capacity of Client/Server Applications", Colorado Technical University, 1997, pp. 1-7.

Selic, "A Generic Framework for Modeling Resources with UML", IEEE, Jun. 2000, pp. 64-69.

"C.O.B.A.S Centralized Out-Of-Band Authentication System", QT Woridtel Inc., Sep. 8-9, 2003, pp. 14.

"Enhanced IP Services for Cisco Networks", retrieved on Jun. 19, 2007, at <<http://proquest.safaribooksonline.com/1578701066>>, Sep. 23, 1999, pp. 11.

Frolund, et al., "Design-Time Simulation of a Large-Scale, Distributed object System" ACM 1998, pp. 374-400.

Howard et al., "Designing Secure Web-Based Applications for Microsoft Windows 2000", 2000.

Levillain, et al., "Switch-Based Server Load Balancing for Enterprises," Alcatel Telecommunications Review; No. 4 pp. 298-302; 2002.

Liu et al., "Visualization in Network Topology Optimization", ACM, 1992, pp. 131-138.

Nerurkar, "Security Analysis and Design", Dr. Dobb's Journal, Nov. 2000, pp. 50-56.

Nestor, "Security Modeling Using Hierarchical State Machines", IEEE 1991, pp. 110-119.

"Pretty Good Privacy PGP for Personal Privacy, Version 5.0 for Windows 95 Windows NT", Pretty Good Privacy Inc., 1997, pp. 137.

Shi et al., "An Effective Model for Composition of Secure Systems", The Journal of Systems and Software, 1998, pp. 233-244.

Somers, "Hybrid: Unifying Centralised and Distributed Network Management using Intelligent Agents" IEEE Network Operations and Management Symposium Kyoto Apr. 15-19, 1996. pp. 34-43.

Sultan, et al., "Migratory TCP: Connection Migration for Service Continuity," in the Internet Proceedings 22nd Intl. Conference on Distributed Computing Systems; Jul. 2002; pp. 469-740.

Wen-Chen Wang, "How a SCVP client authenticates the SCVP server", Online! Sep. 12, 2003, Retrieved from the Internet: URL:http://www.imc.org/ietf-pkix/old-archive-03/msg01323.html], p.1.

Cardelli, L., "Type Systems," CRC Handbook of Computer Science and Engineering, 2nd Edition, Ch. 97, Wednesday, Feb. 25, 2004, 8:00pm CRC Press., http://research.microsoft.com/Users/luca/Papers/TypeSystems.pdf.

"Core Principles of the Dynamic Systems Intitative: Leveraging System Knowledge, Captured in Software Models, to Address Challenges Across the IT Life Cycle," Windows Server System, http://www.microsoft.com/windowsserversystem/dsi/dsicore.mspx.

Menezes, et al., "Handbook of Applied Cryptography", CRC Press, 1996, Chapters 8 & 12, pp. 283-319 and 489-541.

Iwasaki, Hideki "IP Troubles Q & A—The Prevention of Network Troubles and the Risk Management", Computer & Network LAN, Japan Ohmsha, Ltd., vol. 18, No. 8, (Jul. 14, 2000), pp. 29-39.

Iyer, et al., "ClassiPI: An Archetecture for Fast and Flexible Packet Classification," IEEE Network, Mar./Apr. 2001, vol. 15 No. 2.

The Japanese Office Action mailed on Jan. 26, 2007 for Japanese Patent Application No. 2001-326848, a counterpart foreign application of U.S. Appl. No. 6,886,038.

The Japanese Office Action mailed on Dec. 14, 2007 for Japanese Patent Application No. 2001-326848, a counterpart foreign application of U.S. Appl. No. 6,886,038.

Kitjongthawonkul, S., et al., "Modeling Information Systems Using Objects, Agents, and Task-Based Problem Solving Adapters," Proc. 10th Australasian Conference on Information Systems, 1999, http://www.vuw.ac.nz/acis99/Papers/PaperKitjongthawonkul-077.pdf.

Meader, P., "Build Distributed Apps a New Way," VSLive!ShowDaily, San Francisco, Mar. 25, 2004, http://www.ftponline.com/reports/vslivesf/2004/whitehorse2/.

Meader, P., "Model Apps More Effectively," VSLive!ShowDaily, San Francisco, Mar. 24, 2004, http://www.ftponline.com/reports/vslivesf/2004/whitehorse/.

"System Definition Model," Windows Server System Home, http://www.microsoft.com/windowsserversystem/dsi/sdm.mspx.

"The Age Changed by Information Network and System: The Internet Releasing Enterprises and Society A? The New Century created by an E Service and a Terabit Network Service: Disappearance of Enterprise Servers, Service Components behind the Internet", Nikkei Internet Technology, Japan, Nikkei BUsiness Publications, Inc. No. 30, (Dec. 22, 1999), pp. 76-81.

Tofts, C., "HOLOS—A Simulation and Multi Mathematical Modelling Tool," Hewlett-Packard Company, 2001, http://www.hpl.hp.com/techreports/2001/HPL-2001-276.pdf.

Heinl, et al., "A Comprehensive Approach to Flexibility in Workflow Management Systems", WACC 1999, ACM, 1999, pp. 79-88.

"Remote Operating System Installation", retrieved on Feb. 13, 2009 at <<http://technet.microsoft.com/en-us/library/bb742501.aspx>>, Microsoft TechNet, Sep. 9, 1999, pp. 1-28.

Morimoto et al., "Compatabilty Testing for Windows Server 2003", Microsoft Windows Server 2003 Unleashed, Chapter 18, Section 1, Jun. 14, 2004, 2 pages.

Barrett et al., "Model Driven Distrution Pattern Design for Dynamic Web Service Compositions", ACM ICWE 2006, Jul. 11-14, 2006, Palo Alto, CA, USA, pp.#129-pp.#136.

Dolstra et al., "Imposing a Memory Management Discipline on Software Deployment", IEEE Procedeeding of the 26th International Conference on Software Engineering 2004, pp.#1-pp.#10.

Heilala et al., "Modeling and Simulation for Customer Driven Manufacturing System Design and Operations Planning", IEEE, Proceedings of the 2007 Winter Simulation Conference, 2007, pp.#1853-pp.#1862.

Yamasaki et al., "Model-Based Resource Selection for Effiecient Virtual Cluster Deployment", ACM VTDC 2007, Nov. 12, 2007, Reno, NV, USA, pp.#1-pp.#7.

English traslation of Notice of Rejection mailed May 28, 2010 for Japanese Patent Application No. 2004-064566, 8 pages.

Sloman, "Policy Driven Management for Distributed Systems", Journal of Network and System Mangement, 1994, vol. 2, No. 4, Plenum Publishing Corporation 1994, pp. #333-pp. #360.

W3C: "Resourse Description Framework (RDF), Concepts and Abstract Syntax", <<http://www.w3.org/TR2004/REC-rdf-concepts-20040210>>, Feb. 10, 2004, XP002570908.

Yonezawa, "Feature article UML-compatible modeling tool front line, Ensure consistence between code and model, Applicable to a large-scale team development", DB Magazine, Japan, Mar. 1, 2002, vol. 11, No. 13. pp. 97-105.

Yuura, "Component-Oriented Development Method and Environment for Advanced Enterprises Information Systems", Japan, May 1, 1998, vol. 80 No. 5, pp. 25-30.

English translation of: Yuura, "Component-Oriented Development Method and Environment for Advanced Enterprises Information Systems", Japan, May 1, 1998, vol. 80 No. 5, pp. 25-30.

* cited by examiner

MODEL-BASED SYSTEM MONITORING

TECHNICAL FIELD

The invention relates to monitoring systems, and more particularly to model-based monitoring of health, performance, or service-levels associated with a system.

BACKGROUND

Computers have become increasingly commonplace in our world and offer a variety of different functionality. Some computers are designed primarily for individual use, while others are designed primarily to be accessed by multiple users and/or multiple other computers concurrently. These different functionalities are realized by the use of different hardware components as well as different software applications that are installed on the computers.

Although the variety of available computer functionality and software applications is a tremendous benefit to the end users of the computers, such a wide variety can be problematic for the developers of the software applications as well as system administrators that are tasked with keeping computers running. Many computing systems contain a large number of different components that must work together and function properly for the entire computing system to operate properly. If a component fails to function properly, one or more other components that rely on the failed component may likewise function improperly. A component may fail to function properly due to a software failure and/or a hardware failure. These component failures result in the improper operation of the associated computing system.

Accordingly, it would be beneficial to identify a component (or components) within a computing system that is responsible for the improper operation of the computing system.

SUMMARY

Model-based system monitoring is described herein.

In accordance with certain aspects, multiple monitors configured to monitor multiple components in a system are identified. Additionally, multiple health models associated with the multiple monitors are accessed. A monitoring policy is generated to monitor the system. The monitoring policy is derived, at least in part, from the multiple health models.

BRIEF DESCRIPTION OF THE DRAWINGS

The same numbers are used throughout the drawings to reference like features.

DETAILED DESCRIPTION

Model-based system monitoring is described herein. A monitor is defined for each aspect of each component in a managed system. Each monitor maintains information about the operating status or health of the associated component. Each monitor has an associated health model that includes multiple states and transitions between those states. The multiple states represent different health conditions or performance states that may be associated with the particular component being monitored. A monitoring policy is created from the multiple health models. The monitoring policy defines the manner in which the managed system is monitored.

The systems and methods described herein are capable of detecting the health of a managed system (e.g., good, fair, or poor) and can detect problems and potential problems. By monitoring all components in the managed system, the overall health and performance of the managed system can be determined. The systems and methods described herein automate much of the performance and health monitoring tasks using the model discussed below.

As used herein, an application refers to a collection of instructions that can be executed by one or more processors, such as central processing units (CPUs) of one or more computing devices. An application can be any of a variety of different types of software or firmware, or portions thereof. Examples of applications include programs that run on an operating system, the operating system, operating system components, services, infrastructure, middleware, portions of any of these, and so forth.

A system definition model (SDM) describes a system that can be managed. Management of a system can include, for example, installing software on the system, monitoring the performance of the system, maintaining configuration information about the system, verifying that constraints within the system are satisfied, combinations thereof, and so forth. A system can be, for example, an application, a single computing device, multiple computing devices networked together (e.g., via a private or personal network such as a local area network (LAN) or via a larger network such as the Internet), and so forth.

In a particular implementation, the SDM is created, for example, by a developer having knowledge of the various components, relationships, and other aspects of the system being defined. In this implementation, the developer has intimate knowledge of the various components in the system and how they interact with one another. This knowledge is useful in defining the manner in which the various components are monitored or otherwise managed.

Figure 1:
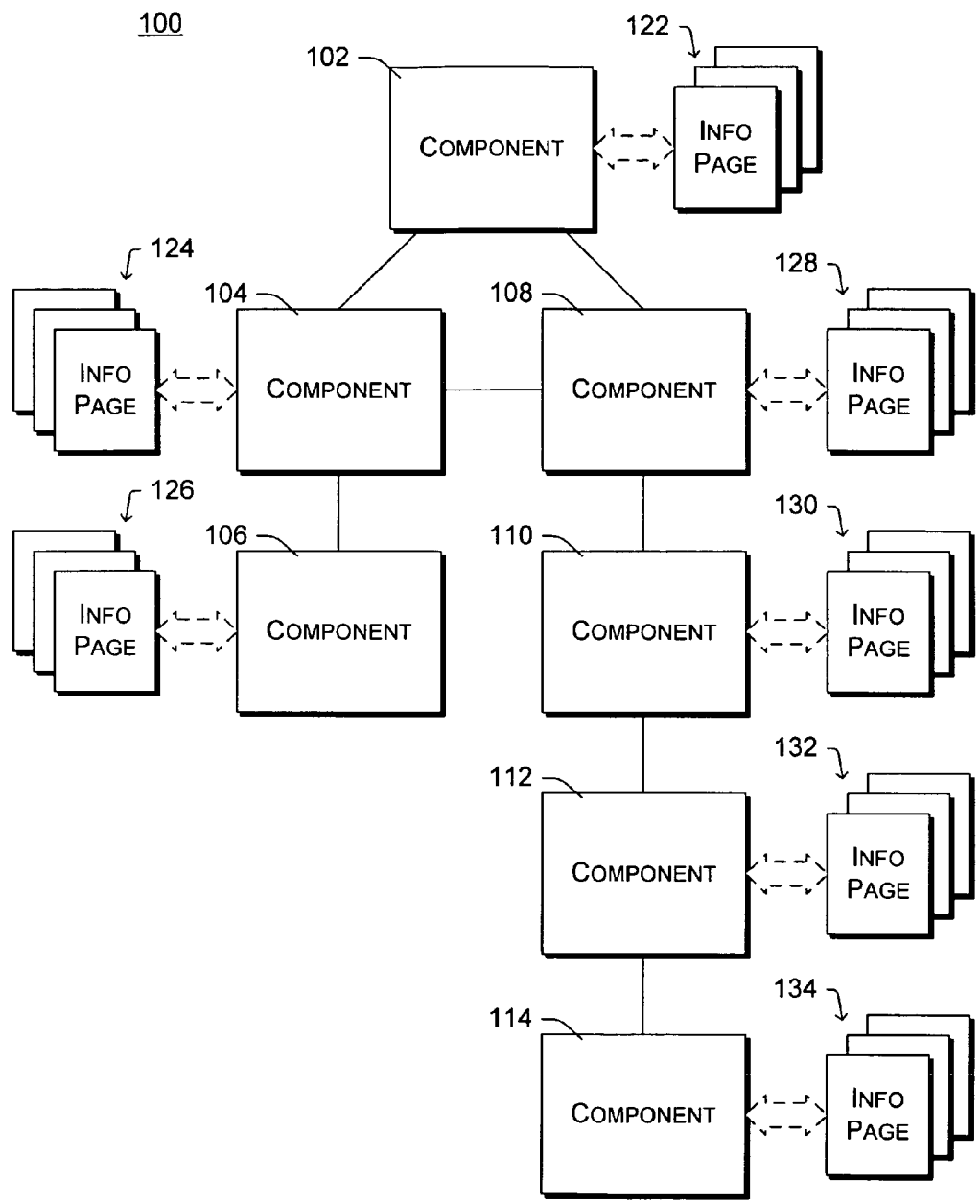
FIG. 1 illustrates an example system definition model (SDM) that can be used with the model-based system monitoring described herein.

FIG. 1 illustrates an example SDM 100 that can be used with the model-based system monitoring described herein. SDM 100 includes a component corresponding to each of one or more software and/or hardware components being managed in a system. These software and/or hardware components being managed refer to those software and/or hardware components that the author of SDM 100 and/or designers of the system desires to include in SDM 100. Examples of hardware and/or software components that could be in a system include an application (such as a database application, email application, file server application, game, productivity application, operating system, and so forth), particular hardware on a computer (such as a network card, a hard disk drive, one of multiple processors, and so forth), a virtual machine, a computer, a group of multiple computers, and so on. A system refers to a collection of one or more hardware and/or software components.

SDM 100 represents a system including component 102, component 104, component 106, component 108, component 110, component 112, and component 114. Although the example SDM 100 includes seven components, in practice a system, and thus the SDM, can include any number of components. Each hardware or software component being managed in a system may be represented by a component in SDM 100.

For example, component 106 could represent a particular computer, while component 104 represents an operating system running on that particular computer. By way of another example, component 106 could represent an operating system, while component 104 represents a database application running on the operating system. By way of yet another example, component 114 could represent a particular computer, while component 112 represents an operating system installed on that particular computer, component 110 represents a virtual machine running on the operating system, and component 108 represents an operating system running on the virtual machine. Note that the operating systems associated with component 112 and component 108 could be the same or alternatively two different operating systems.

The SDM is intended to be a comprehensive knowledge store, containing all information used in managing the system. This information includes information regarding the particular components in the system, as well as relationships among the various components in the system. Despite this intent, it is to be appreciated that the SDM may contain only some of the information used in managing the system rather than all of the information.

Relationships can exist between different components in a system, and these relationships are illustrated in the SDM with lines connecting the related components. Examples of relationships that can exist between components include containment relationships, hosting relationships, and communication relationships. Containment relationships identify one component as being contained by another component—data and definitions of the component being contained are incorporated into the containing component. When one component is contained by another component, that other component can control the lifetime of the contained component, can control the visibility of the contained component, and can delegate behavior to the contained component. In FIG. 1, containment relationships are illustrated by the diagonal lines connecting component 102 and component 104, and connecting component 102 and component 108.

Hosting relationships identify dependencies among components. In a hosting relationship, the hosting component should be present in order for the guest component to be included in the system. In FIG. 1, hosting relationships are illustrated by the vertical lines connecting component 104 and component 106, connecting component 108 and component 110, connecting component 110 and 112, and connecting component 112 and 114.

Communication relationships identify components that can communicate with one another. In FIG. 1, communication relationships are illustrated by the horizontal line connecting component 104 and component 108.

Associated with each component in SDM 100 is one or more information (info) pages. Information pages 122 are associated with component 102, information pages 124 are associated with component 104, information pages 126 are associated with component 106, information pages 128 are associated with component 108, information pages 130 are associated with component 110, information pages 132 are associated with component 112, and information pages 134 are associated with component 114. Each information page contains information about the associated component. Different types of information can be maintained for different components. One or more information pages can be associated with each component in SDM 100, and the particular information that is included in a particular information page can vary in different implementations. All the information can be included on a single information page, or alternatively different pieces of information can be grouped together in any desired manner and included on different pages. In certain embodiments, different pages contain different types of information, such as one page containing installation information and another page containing constraint information. Alternatively, different types of information may be included on the same page, such as installation information and constraint information being included on the same page.

Examples of types of information pages include installation pages, constraint pages, monitoring pages, service level agreement pages, description pages, and so forth. Installation pages include information describing how to install the associated component onto another component (e.g., install an application onto a computer), such as what files to copy onto a hard drive, what system settings need to be added or changed (such as data to include in an operating system registry), what configuration programs to run after files are copied onto the hard drive, sequencing specifications that identify that a particular installation or configuration step of one component should be completed before an installation or configuration step of another component, and so forth.

Constraint pages include information describing constraints for the associated component, including constraints to be imposed on the associated component, as well as constraints to be imposed on the system in which the associated component is being used (or is to be used). Constraints imposed on the associated component are settings that the component should have (or alternatively should not have) when the component is installed into a system. Constraints imposed on the system are settings (or other configuration items, such as the existence of another application or a piece of hardware) that the system should have (or alternatively should not have) in order for the associated component to be used in that particular system. Constraint pages may also optionally include default values for at least some of these settings, identifying a default value to use within a range of values that satisfy the constraint. These default values can be used to assist in installation of an application, as discussed in more detail below.

It should also be noted that constraints can flow across relationships. For example, constraints can identify settings that any component that is contained by the component, or that any component that contains the component, should have (or alternatively should not have). By way of another example, constraints can identify settings that any component that is hosted by the component, or that any component that hosts the component, should have (or alternatively should not have). By way of yet another example, constraints can identify settings that any component that communicates with the component should have (or alternatively should not have).

In addition, constraint pages may also include a description of how particular settings (or components) are to be discovered. For example, if a constraint indicates that an application should not co-exist with Microsoft® SQL Server, then the constraint page could also include a description of how to discover whether Microsoft® SQL Server is installed in the system. By way of another example, if a constraint indicates that available physical memory should exceed a certain threshold, then the constraint page could also include a description of how to discover the amount of available physical memory in the system. By way of still another example, if a constraint indicates that a security setting for Microsoft® SQL Server should have a particular value, then the constraint page could also include a description of how to discover the value of that security setting for Microsoft® SQL Server.

Constraint pages may also include a description of how particular settings are to be modified if they are discovered to not be in compliance with the constraints. Alternatively, the constraint pages could include specifications of some other action(s) to take if particular settings are discovered to not be in compliance with the constraints, such as sending an event into the system's event log, alerting an operator, starting a software application to take some corrective action, and so forth. Alternatively, the constraint pages could include a policy that describes what action to take under various circumstances, such as depending on the time of day, depending on the location of the system.

Monitoring pages include information related to monitoring the performance and/or health of the associated component. This information can include rules describing how the associated component is to be monitored (e.g., what events or other criteria to look for when monitoring the component), as well as what actions to take when a particular rule is satisfied (e.g., record certain settings or what events occurred, sound an alarm, etc.).

Service level agreement pages include information describing agreements between two or more parties regarding the associated component (e.g., between a service provider and a consumer). These can be accessed during operation of the system to determine, for example, whether the agreement reached between the two or more parties is being met by the parties.

Description pages include information describing the associated component, such as various settings for the component, or other characteristics of the component. These settings or characteristics can include a name or other identifier of the component, the manufacturer of the component, when the component was installed or manufactured, performance characteristics of the component, and so forth. For example, a description page associated with a component that represents a computing device may include information about the amount of memory installed in the computing device, a description page associated with a component that represents a processor may include information about the speed of the processor, a description page associated with a component that represents a hard drive may include information about the storage capacity of the hard drive and the speed of the hard drive, and so forth.

As can be seen in FIG. 1, an SDM maintains various information (e.g., installation, constraints, monitoring, etc.) regarding each component in the system. Despite the varied nature of these information pages, they can be maintained together in the SDM and thus can all be readily accessed by various utilities or other applications involved in the management of the system. Alternatively, the SDM may have a federated architecture in which some types of information are located outside the SDM and the SDM maintains a reference to that information.

An SDM can be generated and stored in any of a variety of different ways and using any of a variety of different data structures. For example, the SDM may be stored in a database. By way of another example, the SDM may be stored in a file or set of multiple files, the files being encoded in XML (Extensible Markup Language) or alternatively some other form. By way of yet another example, the SDM may not explicitly stored, but constructed each time it is needed. The SDM could be constructed as needed from information existing in other forms, such as installation specifications.

In certain embodiments, the SDM is based on a data structure format including types, instances, and optionally configurations. Each component in the SDM corresponds to or is associated with a type, an instance, and possibly one or more configurations. Additionally, each type, instance, and configuration corresponding to a particular component can have its own information page(s). A type refers to a general template having corresponding information pages that describe the component generally. Typically, each different version of a component will correspond to its own type (e.g., version 1.0 of a software component would correspond to one type, while version 1.1 of that software component would correspond to another type). A configuration refers to a more specific template that can include more specific information for a particular class of the type. An instance refers to a specific occurrence of a type or configuration, and corresponds to an actual physical component (software, hardware, firmware, etc.).

For types, configurations, and instances, associated with a component, information contained in information pages associated with an instance can be more specific or restrictive than, but generally cannot contradict or be broader than, the information contained in information pages associated with the type or the configuration. Similarly, information contained in information pages associated with a configuration can be more specific or restrictive than, but cannot contradict or be broader than, the information contained in information pages associated with the type. For example, if a constraint page associated with a type defines a range of values for a buffer size, the constraint page associated with the configuration or the instance could define a smaller range of values within that range of values, but could not define a range that exceeds that range of values.

It should be noted, however, that in certain circumstances a model of an existing system as deployed (that is, a particular instance of a system) may violate the information contained in information pages associated with the type for that existing system. This situation can arise, for example, where the system was deployed prior to an SDM for the system being created, or where a user (such as a system administrator) may have intentionally deployed the system in noncompliance with the information contained in information pages associated with the type for that existing system.

Figure 2:
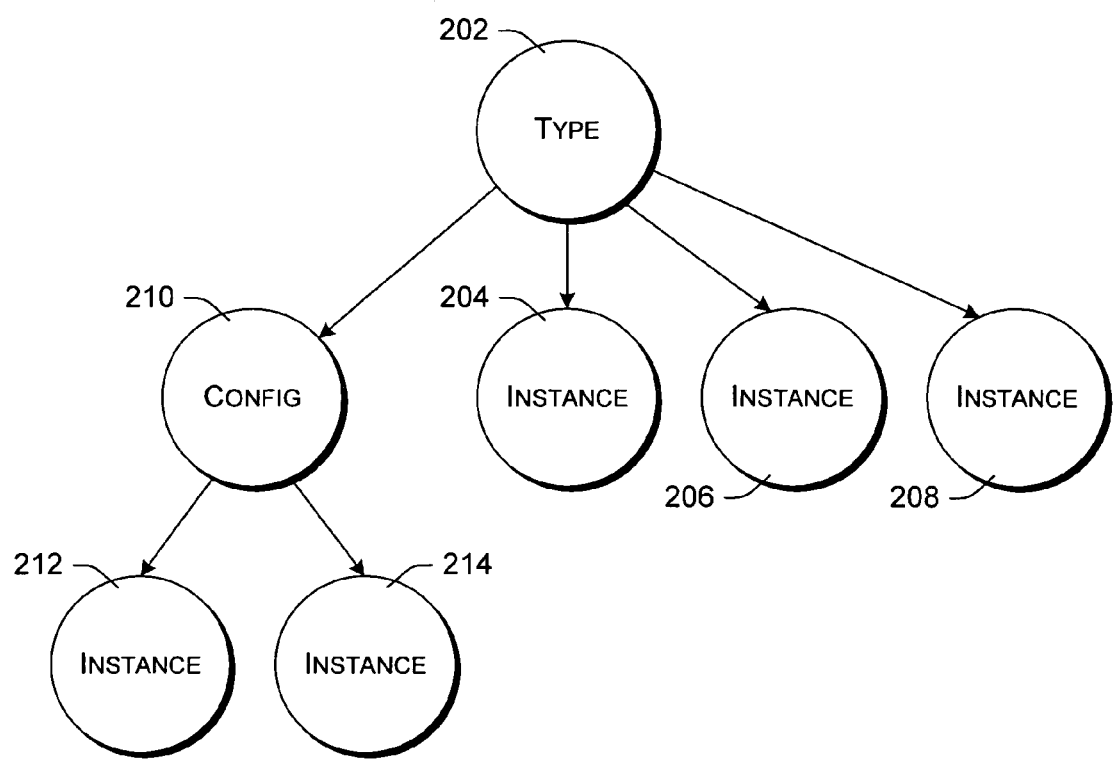
FIG. 2 illustrates an example use of types, configurations, and instances.

The use of types, configurations, and instances is illustrated in FIG. 2. In FIG. 2, a type 202 corresponds to a particular component. Three different instances 204, 206, and 208 of that particular component exist and are based on type 202. Additionally, a configuration (config) 210 exists which includes additional information for a particular class of the particular component, and two instances 212 and 214 of that particular class of the particular component.

For example, assume that a particular component is a database application. A type 202 corresponding to the database application is created, having an associated constraint information page. The constraint information page includes various general constraints for the database application. For example, one of the constraints may be a range of values that a particular buffer size should be within for the database application. Type 202 corresponds to the database application in general.

Each of the instances 204, 206, and 208 corresponds to a different example of the database application. Each of the instances 204, 206, and 208 is an actual database application, and can have its own associated information pages. For example, each instance could have its own associated description information page that could include a unique identifier of the particular associated database application. By way of another example, the constraint information page associated with each instance could include a smaller range of values for the buffer size than is indicated in the constraint information page associated with type 202.

The information pages corresponding to the instances in FIG. 2 can be in addition to, or alternatively in place of, the information pages corresponding to the type. For example, two constraint information pages may be associated with each instance 204, 206, and 208, the first constraint information page being a copy of the constraint information page associated with type 202 and the second constraint information page being the constraint information page associated with the particular instance and including constraints for just that instance. Alternatively, a single constraint information page may be associated with each instance 204, 206, and 208, the single constraint information page including the information from the constraint information page associated with type 202 as well as information specific to the particular instance. For example, the range of values that the particular buffer size should be within for the database application would be copied from the constraint information page associated with type 202 to the constraint information page associated with each instance. However, if the constraint information page for the instance indicated a different range of values for that particular buffer size, then that different range of values would remain in the constraint information page associated with the instance rather than copying the range of values from the constraint information page associated with type 202.

Following this example of a database application, configuration 210 corresponds to a particular class of the database application. For example, different classes of the database application may be defined based on the type of hardware the application is to be installed on, such as different settings based on whether the computer on which the database application is to be installed is publicly accessible (e.g., accessible via the Internet), or based on whether an operating system is already installed on the server. These different settings are included in the constraint information page associated with configuration 210.

Each of the instances 212 and 214 corresponds to a different example of the database application. Similar to instances 204, 206, and 208, each of instances 212 and 214 is an actual database application product, and can have its own information page(s). However, unlike instances 204, 206, and 208, the constraint information pages associated with instances 212 and 214 each include the constraints that are in the constraint information page associated with configuration 210 as well as the constraints in the constraint information page associated with type 202.

It should be noted that, although the information pages are discussed as being separate from the components in the SDM, the data structure(s) implementing the SDM could alternatively include the information discussed as being included in the various information pages. Thus, the component data structures themselves could include the information discussed as being included in the various information pages rather than having separate information pages.

The installation page associated with a component can be used as a basis for provisioning a system. Provisioning a system refers to installing an application(s) on the system, as well as making any necessary changes to the system in order for the application(s) to be installed. Such necessary changes can include, for example, installing an operating system, installing one or more other applications, setting configuration values for the application or operating system, and so forth.

In the discussions herein, reference is made to different classes of computing devices. Each of these different classes of computing devices refers to computing devices having particular common characteristics, so they are grouped together and viewed as a class of devices. Examples of different classes of devices include IIS (Internet Information Services) servers that are accessible to the Internet, IIS servers that are accessible only on an internal intranet, database servers, email servers, order processing servers, desktop computers, and so forth. Typically, each different class of computing device corresponds to one of the configurations in the system model.

Figure 3:
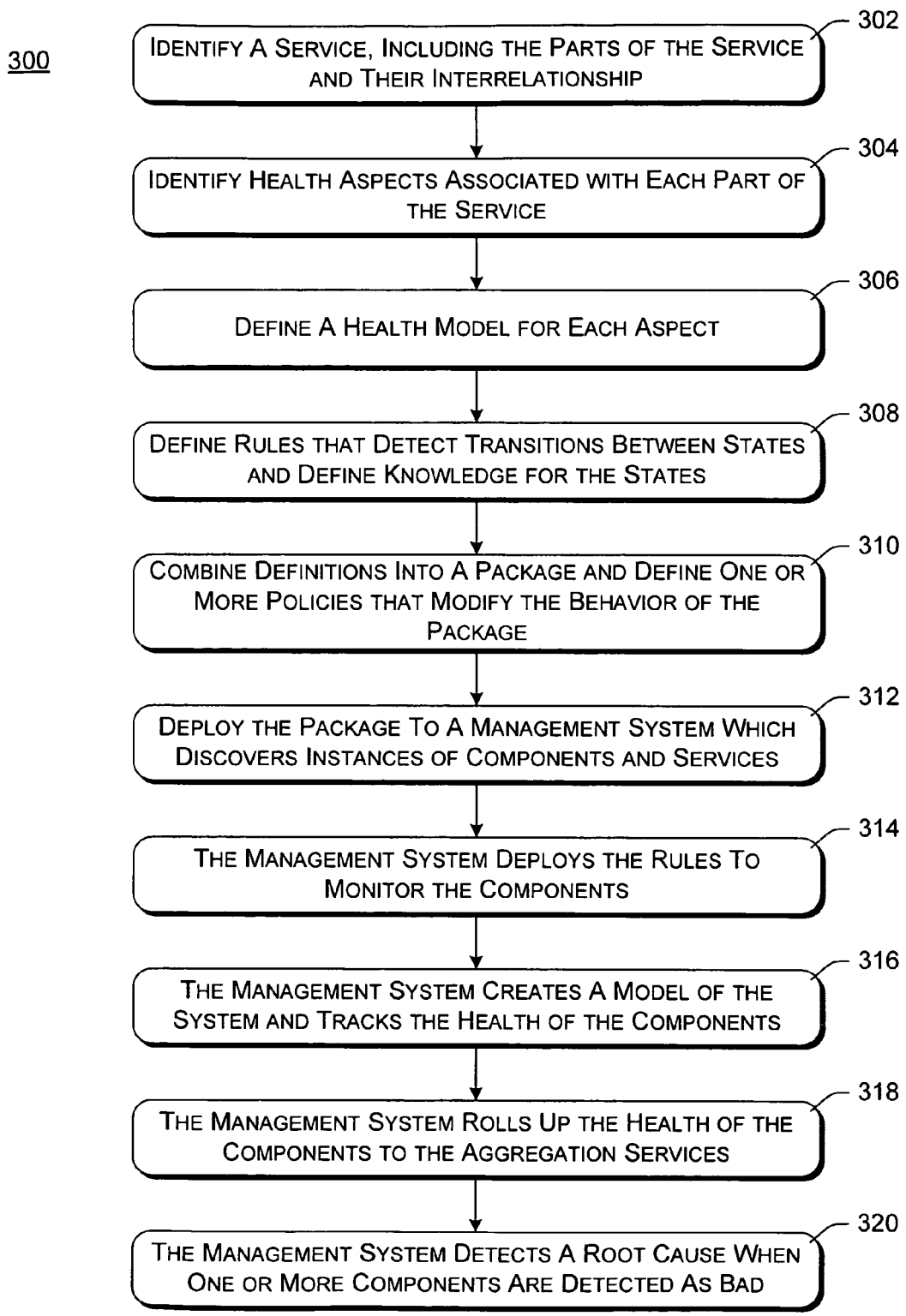
FIG. 3 is a flowchart illustrating an example process for monitoring a system.

FIG. 3 is a flowchart illustrating an example process 300 for monitoring a system. Process 300 can be implemented in software, firmware, and/or hardware. Initially, a service is identified, including the parts of the service and the interrelationship between the parts (block 302). The process the identifies health aspects associated with each part of the service (block 304) and defines a health model for each aspect (block 306). Each health model includes multiple states and transitions between those states. Each state may represent, for example, a health condition or a performance status that is associated with the particular component being monitored.

The process continues by defining rules that detect transitions between states and by defining knowledge for the states (block 308). The various definitions are combined into a package (also referred to as a "Management Package") and one or more policies are defined that modify the behavior of the package (block 310). The systems and methods described herein combine the various models and policies associated with a system into a management package that is portable. This portable management package can be sold or deployed.

The monitoring policy defines the manner in which the managed system is monitored. In a particular embodiment, the monitoring policy contains information regarding all instances or components to be monitored. For example, the monitoring policy may define the states, severities, and transitions for one or more components. The monitoring policy may also define information regarding different aspects of a particular component. For example, the monitoring policy can monitor server performance, average response time for web page requests, database performance, percentage of requests that timeout, or the number of component failures. When monitoring the performance of a component or system, one or more health-related alerts or messages may be generated. For example, when monitoring the average response time for web page requests, if the average response time increases significantly, an alert or other message may be generated indicating a problem or potential problem with the handling of web page requests.

The monitoring policy is also capable of monitoring service-level compliance (e.g., system compliance with one or more service agreements) of the system. Service level agreements may define, for example, a maximum number of page requests that fail during a particular time period, or a minimum number of minutes that a particular resource or component is active each month. As discussed herein, the monitoring policy may also identify problems, potential problems, or other situations that may cause the system to operate improperly.

Authors and administrators typically like policies to have modified behavior when encountering different environments. These different behaviors are described in one or more policies which are associated with dynamically discovered instances of the policy type.

The process then deploys the package to a management system which discovers instances of components and services in a system (block 312). The management system provides the apparatus or platform to run the models and monitoring policies discussed herein. The monitoring policies include rules to discover real instances of components, systems, and relationships between components and/or systems. The management system discovers these things and builds a model representing the system or environment being managed.

The management system then deploys the rules to monitor the components and services in the system (block 314). The management system modifies the rules, as necessary, based on the administrative policies that apply to the discovered instances. Conflicts may occur between multiple administrative policies. When a conflict occurs, the management system resolves the conflict to generate a resulting administrative policy that appropriately modifies the monitoring rules.

Next, the management system creates a model of the system and tracks the health of the components in the system (block 316). This monitoring of the system is ongoing and monitors the system components for failures, poor performance, erroneous performance, and the like. The management system then rolls up the health of the components to one or more aggregation services (block 318). A managed entity that groups or contains other entities can express its health in terms of the health of the child entities—this is commonly referred to as "roll-up". Roll-up is used to draw attention to a problem in a contained entity, in a scaleable fashion or to report on aggregate metrics.

Finally, the management system detects a root cause of a problem or error when one or more components are detected as bad (block 320).

The above approach simplifies the management of the components (and aspects of the components) in a system by providing smaller, manageable units. For example, instead of pre-determining all possible transitions between states in a system, each aspect (such as virtual CPU performance) is defined along with its possible states. Each aspect is orthogonal to other aspects such that the state of each aspect has little or nothing to do with the state of other aspects. Monitoring of an additional aspect is accomplished by defining the new aspect and its possible states.

As discussed above, one or more monitoring pages contained in the SDM include information related to monitoring the performance and/or health of the associated component. This information can include rules describing how the associated component is to be monitored (e.g., what events or other criteria to look for when monitoring the component), as well as what actions to take when a particular rule is satisfied (e.g., record certain settings or what events occurred, generate an alert, etc.).

Additionally, one or more service level agreement pages include information describing service level agreements between two or more parties regarding the associated component (e.g., between the purchaser of the associated component and the seller from which the associated component was purchased). These pages can be accessed during operation of the system to determine, for example, whether the agreement reached between the two or more parties is being met by the parties. In one embodiment, accessing of monitoring pages and service level agreement pages is defined by the monitoring policy.

Each aspect of each component in a system has an associated monitor, which tracks the health and/or performance of the associated component. The severity of the state of each aspect is "rolled-up" to compute the severity of the component. If a component is composed of one or more components, the state gets rolled-up based on a choice of aggregation algorithms. For example, a domain controller that cannot accept one or more requests is put into a critical state, while delays in servicing those requests are marked as being in a warning state. In one embodiment, monitors have a hierarchical structure similar to the structure shown in FIG. 1, which allows the monitors to "roll up" health and performance information to other monitors. In particular, the hierarchy "rolls up" based on the SDM model. The hierarchy and "roll up" described herein represents one type of structure that can be used with the described model-based system monitoring. Alternate embodiments can propagate information through relationships in the model based on propagation algorithms associated with each kind of relationship. For example, "roll up" can be performed in a containment hierarchy based on a worst-case-among-the-children algorithm.

The health of a particular component can be determined based on various factors, such as the availability of the component, available capacity, configuration, security policy compliance, etc. A health model is a framework for describing a managed components' potential operational, degradation and failure states.

In particular embodiments, a management system may use information from multiple sources. For example, a management system may receive an SDM from one source, another SDM from a second source, and a set of monitoring policies from a third source. A management system can receive information from any number of different sources. The management system identifies and handles the various relationships between objects in different models and/or received from different sources. Thus, the management system pulls together the information from various sources and uses all of the information in managing a particular system or environment.

Additionally, the same management system and the same information can be used by different administrators in different disciplines to display alerts or data of interest to that administrator or discipline. For example, the management system may display application security compliance to an administrator responsible for overseeing such security compliance. The same management system (using the same information) may display information regarding available storage resources to an administrator responsible for handling or monitoring those storage resources. Thus, the management system uses filters or otherwise manages data to display the appropriate data (e.g., requested data) to various administrators or disciplines.

Figure 4:
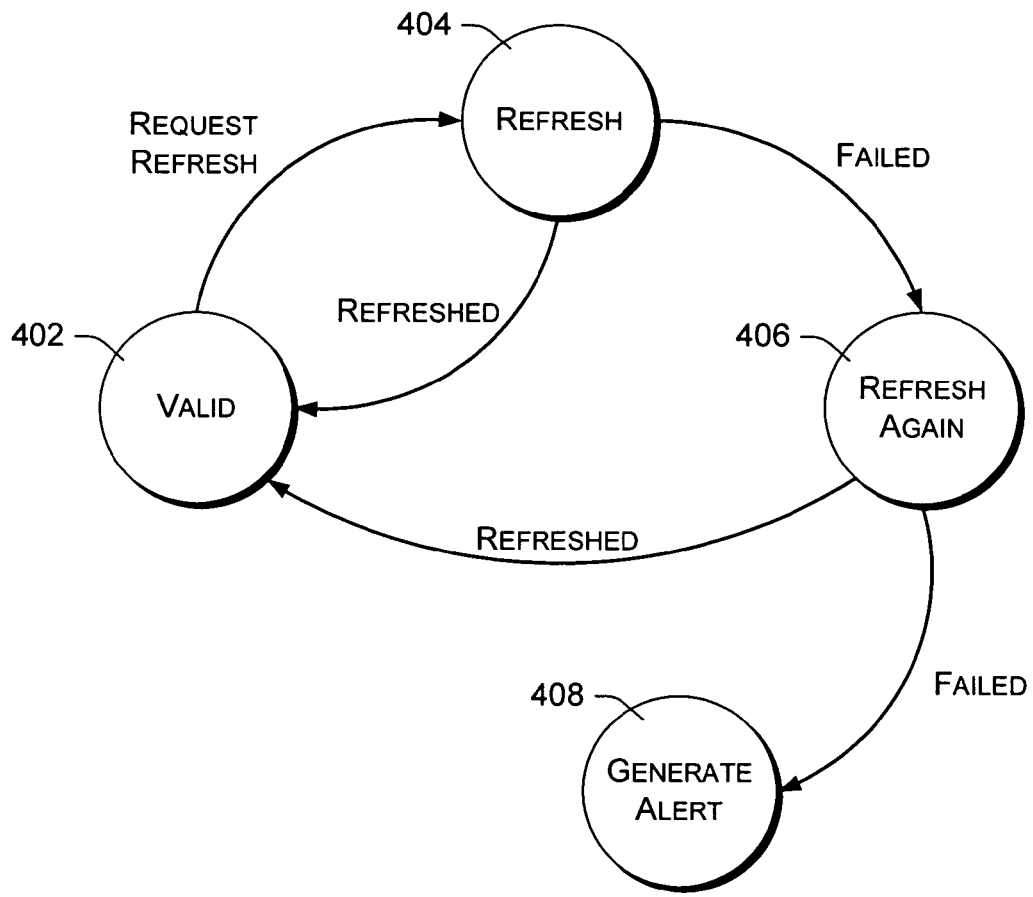
FIG. 4 illustrates an example health model.

FIG. 4 illustrates an example health model 400. In this example, health model 400 defines the updating of a security credentials monitor. During normal operation, health model 400 is in a valid state 402. At periodic intervals, the security credentials need to be refreshed. Such a request causes the model to transition to a refresh state 404. If the security credentials are properly refreshed, the model transitions back to valid state 402. If the security credentials are not properly refreshed, the model transitions to state 406, where another attempt is made to refresh the security credentials. If the second attempt is successful, the model transitions back to valid state 402. Otherwise, the security refresh has failed and the model transitions to state 408, which generates an alert. Thus, the health of model 400 can be determined by evaluating the current state of the model. This information is useful in detecting, verifying, diagnosing and resolving problems with the system as well as particular components in the system.

Typical health models include one or more states that help detect, verify, diagnose, and resolve a problem state. For example, a problem (or potential problem) can be detected by interpretation of data that indicates a transition to a particular state in the health model. Diagnostic information includes actions necessary to understand the nature of the detected problem. The actions include, for example, automated tasks or examining supporting data (e.g., event data and performance data). Resolution information includes the operations necessary to resolve the problem.

In a particular embodiment, a monitor is configured via rules to declaratively express conditions when state transitions should occur. The rules include various modules, which are precompiled functions that can deliver reusable functionality for event sourcing, probing, interpreting the collected data by checking for conditions or performing a correlation and taking action. A rule configuration defines the interaction among the various modules. These same modules can also used to create one or more tasks. Tasks are actions such as diagnostic functions or problem recovery actions.

For example, a rule may monitor various data sources or components that generate events, alerts, and other notices. If a particular event or alert is detected, the rule modifies the state of the health model based on the transition associated with the event or alert. The rule then identifies an appropriate response, such as taking a corrective action, generating an alert, sending an email message to an administrator, or paging an administrator.

Certain human-readable information may be associated with a health model. This information is provided as knowledge along with the monitor. The information can be supplied by the product vendor or by the user of the product. The information may include embedded links to views and tasks necessary to diagnose and fix a problem. Example information provides a summary of the problem, one or more steps to diagnose the problem, and one or more steps to resolve the problem based on the results of performing the diagnosis steps.

Various relationships can be defined between different managed entities (or components). Example relationships include:

a containment relationship (a particular application contains a database), a hosting relationship (a web site is hosted on IIS), a communication relationship (an application is an SQL client of a database server), a reference relationship (a loose relationship between applications, components, etc.), grouping information (such as static and dynamic computer groups. Groups can be nested or overlapping.), and "caused by" information (any of the above relationships can be used to define a dependency. For example, "an underperforming host can cause a guest to under perform.")

A component that groups or contains other components can express its health or performance in terms of the health or performance of the child components—this is commonly referred to as "roll-up". Roll-up is useful in identifying a problem in a contained component in a scaleable manner. Roll-up is also useful in reporting on aggregate metrics. Roll-up is performed using aggregation algorithms for expressing the state, performance, and events of a container in terms of contained or grouped objects. For example, referring back to FIG. 1, component 110 can express its health or performance in terms of the health or performance of component 112 and component 114. In one embodiment, a user can define the roll-up policy based on the SDM topology.

In addition to monitoring the health or performance of particular components, administrators are interested in identifying causes of failures or other improper operation. For example, a component may fail or operate improperly based on a problem with that particular component. Alternatively, a component may fail or operate improperly due to a problem with another component. For example, if a SQL server fails, applications attempting to access the failed SQL server will likely generate error notices.

Analyzing a failure of one component to see if another component is actually responsible for the failure is referred to as "probable cause" analysis or "root cause" analysis. For example, a failed web service (first component) may trace its probable cause to a database (second component), which traces its probable cause to a failed SQL server (third component) that hosts the database, which traces its probable cause to a backup of disk input/output operations (fourth component) in the underlying server.

In certain situations, it is desirable to suppress certain alerts and other notices. For example, if a SQL server fails, applications attempting to access the failed SQL server will generate alerts. Since the SQL server failure is already known, generation of additional alerts by the applications is unnecessary. These additional alerts would likely be a distraction to the administrator attempting to correct the SQL server failure.

In other situations, administrators may want to know the impact of a change or failure on other components. For example, referring again to FIG. 1, an administrator may want to know the impact on the health or performance of component 112 if a change is made to the state of component 110. This "impact analysis" allows an administrator to predict the impact on the system caused by a particular change before implementing the change. For example, impact analysis can predict changes in system performance, changes in system health, whether or not system level agreements will continue to be satisfied, and the like. Impact analysis uses information available through the SDM to determine the impact of one or more changes to one or more components in the system. Additionally, impact analysis can determine the impact on the overall performance and/or health of the system caused by one or more changes. This impact analysis can be performed using the SDM information without actually implementing the changes. Thus, an administrator can perform various "what if" analyses without affecting the normal operation of the system. Rules, discussed herein, use relationships to dynamically and declaratively express logic for roll-up, aggregation, root cause analysis, and impact analysis.

As mentioned above, one or more service level agreement pages of the SDM include information describing service level agreements between two or more parties regarding the associated component. Service level agreements are generally set based on the service as experienced by the users. "Users" may include human users, software systems, hardware systems, and the like. Administrators can define their level of service as a component of the SDM. This component aggregates pre-discovered and predefined components and rolls-up their health and performance according to one or more service level agreements. To enable self-managing service structures, the grouping of components can be dynamic. For example, if a service level agreement calls for 99% availability for all print servers in Redmond, Wash., the service will add and remove print servers automatically as they are deployed and retired. Remote monitoring services may be used to observe real or representative clients.

When monitoring a system, the monitoring policy performs end-to-end analysis of the system. End-to-end analysis of the system includes monitoring the performance of the entire system and monitoring the performance of a group of components that handle data, requests, or other information in a sequential manner.

Figure 5:
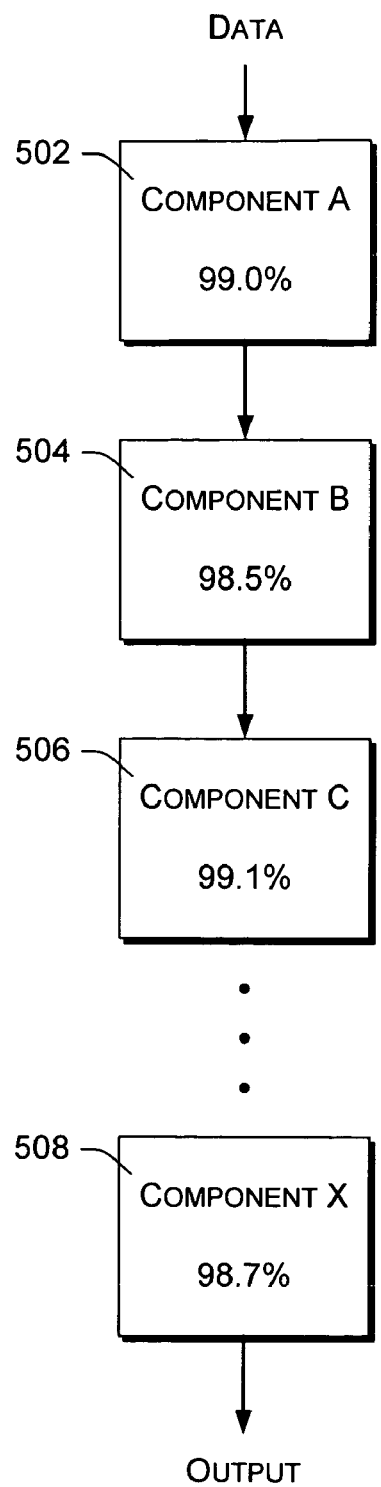
FIG. 5 illustrates multiple components that process data in a sequential manner.

For example, FIG. 5 illustrates multiple components that process data in a sequential manner. The data being processed can be any type of data received from any data source. Initially, a component 502 receives the data to be processed, followed by components 504 and 506. After component 506 has processed the data, any number of other intermediate components (not shown) may process the data, after which the data is provided to a component 508. Each component 502-508 shown in FIG. 5 has an associated percentage (e.g., component 502 has an associated percentage of 99.0 and component 504 has an associated percentage of 98.5). These percentages indicate, for example, the current efficiency associated with the component or the current delay imposed by the component in processing data. When viewing each component individually, the associated percentage is within a reasonable range. For example, the lowest percentage in FIG. 5 is 98.5%. If a service level agreement calls for a minimum component performance of at least 98%, all components shown in FIG. 5 satisfy the service level agreement.

However, when performing an end-to-end analysis of the components, the end-to-end performance may be unacceptable. For example, if the percentages represent delays in processing data, the multiple delays are cumulative. If data is processed sequentially by fifteen different components, each of which introduces an average of 1.2% delay, the cumulative end-to-end delay in processing the data is 18%. Thus, although each component is individually within an acceptable operating range, the end-to-end analysis indicates significantly lower performance.

The systems and methods described herein use the SDM to perform end-to-end analysis. This end-to-end analysis can identify potential points of failure or identify areas that are reducing the overall system performance. Although a failure may not yet have occurred, the results of the end-to-end analysis are helpful in avoiding failures and maintaining the system at a high level of performance.

Figure 6:
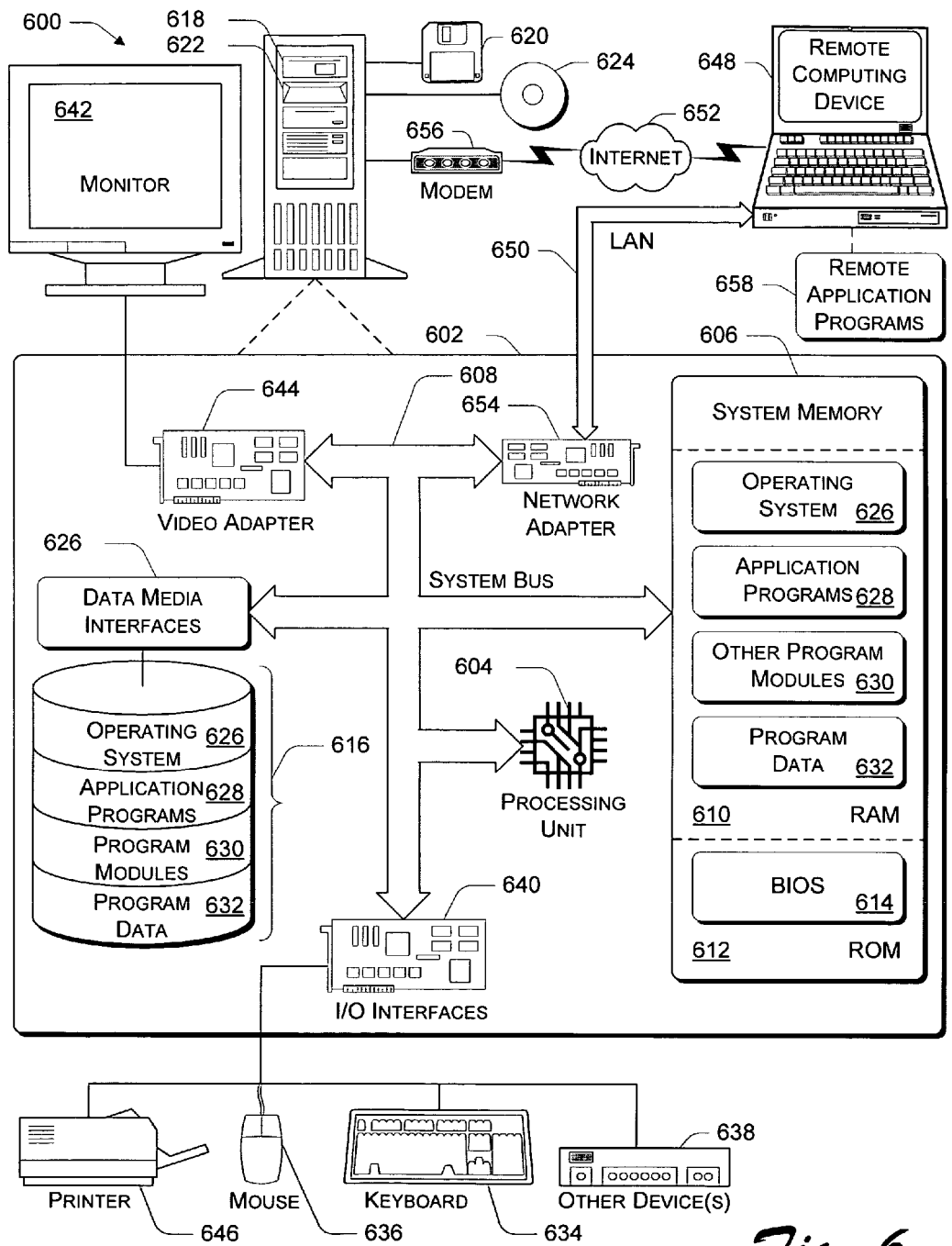
FIG. 6 illustrates an example general computer environment, which can be used to implement the techniques described herein.

FIG. 6 illustrates an example general computer environment 600, which can be used to implement the techniques described herein. The computer environment 600 is only one example of a computing environment and is not intended to suggest any limitation as to the scope of use or functionality of the computer and network architectures. Neither should the computer environment 600 be interpreted as having any dependency or requirement relating to any one or combination of components illustrated in the example computer environment 600.

Computer environment 600 includes a general-purpose computing device in the form of a computer 602. Computer 602 can be, for example, a desktop computer, a handheld computer, a notebook or laptop computer, a server computer, a game console, and so on. The components of computer 602 can include, but are not limited to, one or more processors or processing units 604, a system memory 606, and a system bus 608 that couples various system components including the processor 604 to the system memory 606.

The system bus 608 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 602 typically includes a variety of computer readable media. Such media can be any available media that is accessible by computer 602 and includes both volatile and non-volatile media, removable and non-removable media.

The system memory 606 includes computer readable media in the form of volatile memory, such as random access memory (RAM) 610, and/or non-volatile memory, such as read only memory (ROM) 612. A basic input/output system (BIOS) 614, containing the basic routines that help to transfer information between elements within computer 602, such as during start-up, is stored in ROM 612. RAM 610 typically contains data and/or program modules that are immediately accessible to and/or presently operated on by the processing unit 604.

Computer 602 may also include other removable/non-removable, volatile/non-volatile computer storage media. By way of example, FIG. 6 illustrates a hard disk drive 616 for reading from and writing to a non-removable, non-volatile magnetic media (not shown), a magnetic disk drive 618 for reading from and writing to a removable, non-volatile magnetic disk 620 (e.g., a "floppy disk"), and an optical disk drive 622 for reading from and/or writing to a removable, non-volatile optical disk 624 such as a CD-ROM, DVD-ROM, or other optical media. The hard disk drive 616, magnetic disk drive 618, and optical disk drive 622 are each connected to the system bus 608 by one or more data media interfaces 626. Alternatively, the hard disk drive 616, magnetic disk drive 618, and optical disk drive 622 can be connected to the system bus 608 by one or more interfaces (not shown).

The disk drives and their associated computer-readable media provide non-volatile storage of computer readable instructions, data structures, program modules, and other data for computer 602. Although the example illustrates a hard disk 616, a removable magnetic disk 620, and a removable optical disk 624, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 616, magnetic disk 620, optical disk 624, ROM 612, and/or RAM 610, including by way of example, an operating system 626, one or more application programs 628, other program modules 630, and program data 632. Each of such operating system 626, one or more application programs 628, other program modules 630, and program data 632 (or some combination thereof) may implement all or part of the resident components that support the distributed file system.

A user can enter commands and information into computer 602 via input devices such as a keyboard 634 and a pointing device 636 (e.g., a "mouse"). Other input devices 638 (not shown specifically) may include a microphone, joystick, game pad, satellite dish, serial port, scanner, and/or the like. These and other input devices are connected to the processing unit 604 via input/output interfaces 640 that are coupled to the system bus 608, but may be connected by other interface and bus structures, such as a parallel port, game port, or a universal serial bus (USB).

A monitor 642 or other type of display device can also be connected to the system bus 608 via an interface, such as a video adapter 644. In addition to the monitor 642, other output peripheral devices can include components such as speakers (not shown) and a printer 646 which can be connected to computer 602 via the input/output interfaces 640.

Computer 602 can operate in a networked environment using logical connections to one or more remote computers, such as a remote computing device 648. By way of example, the remote computing device 648 can be a personal computer, portable computer, a server, a router, a network computer, a peer device or other common network node, and the like. The remote computing device 648 is illustrated as a portable computer that can include many or all of the elements and features described herein relative to computer 602.

Logical connections between computer 602 and the remote computer 648 are depicted as a local area network (LAN) 650 and a general wide area network (WAN) 652. Such networking environments are commonplace in offices, enterprise-wide computer networks, intranets, and the Internet.

When implemented in a LAN networking environment, the computer 602 is connected to a local network 650 via a network interface or adapter 654. When implemented in a WAN networking environment, the computer 602 typically includes a modem 656 or other means for establishing communications over the wide network 652. The modem 656, which can be internal or external to computer 602, can be connected to the system bus 608 via the input/output interfaces 640 or other appropriate mechanisms. It is to be appreciated that the illustrated network connections are exemplary and that other means of establishing communication link(s) between the computers 602 and 648 can be employed.

In a networked environment, such as that illustrated with computing environment 600, program modules depicted relative to the computer 602, or portions thereof, may be stored in a remote memory storage device. By way of example, remote application programs 658 reside on a memory device of remote computer 648. For purposes of illustration, application programs and other executable program components such as the operating system are illustrated herein as discrete blocks, although it is recognized that such programs and components reside at various times in different storage components of the computing device 602, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in a such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Alternatively, portions of the framework may be implemented in hardware or a combination of hardware, software, and/or firmware. For example, one or more application specific integrated circuits (ASICs) or programmable logic devices (PLDs) could be designed or programmed to implement one or more portions of the framework.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A computer implemented method comprising:
storing, in a memory, instructions for performing the method;
executing the instructions on a processor;
according to the instructions being executed:
identifying a plurality of health monitors configured to monitor a plurality of components in a system, wherein the plurality of health monitors are defined by a common system definition model that describes the system and wherein each of the monitored components includes an associated plurality of pages of data associated with each monitored component, the plurality of pages comprising:
an installation page, wherein the installation page comprises data describing how to install the associated monitored component onto another monitored component;
a constraints page, wherein the constraints page comprises data describing constraints imposed on the associated monitored component, constraints to be imposed on the system in which the associated monitored component is being utilized and a description of how the associated monitored component is to be discovered;
a monitoring page, wherein the monitoring page comprises rules describing how the associated monitored component is to be monitored and actions to take when a particular rule is satisfied;
a service level agreement page, wherein the service level agreement page defines a service level agreement between a purchaser of the monitored component and a party associated with the sale of the monitored component; and
a description page, wherein the description page comprises data describing characteristics of the associated monitored component, wherein the characteristics comprise:
name of the associated monitored component;
manufacturer of the associated monitored component;
installation date of the associated monitored component; and performance characteristics of the associated monitored component;

accessing a plurality of health models associated with the plurality of monitors;

generating a monitoring policy to monitor the system, the monitoring policy being derived at least in part from the plurality of health models;

identifying a service level agreement associated with the system, wherein identifying a service level agreement associated with the system comprises utilizing the service level agreement page associated with each component;

determining relationships between the plurality of components, wherein determining relationships between the plurality of components comprises utilizing data contained within the plurality of pages;

determining an aggregate performance of a plurality of components in the system; and determining whether the aggregate performance of the plurality of components satisfies the service level agreement associated with the system and whether each of the plurality of components satisfies its associated service level agreement.

2. A method as recited in claim 1, wherein accessing a plurality of health models includes accessing a plurality of health models from a plurality of different sources.

3. A method as recited in claim 1, wherein generating a monitoring policy includes:
generating a monitoring policy to monitor a first health condition and
a second health condition.

4. A method as recited in claim 1, wherein the plurality of health monitors are defined during development of the system definition model.

5. A method as recited in claim 1, wherein each health model includes a plurality of states and a plurality of transitions between the plurality of states, and wherein the plurality of states represent different health conditions that can be associated with a particular component.

6. A method as recited in claim 1, further comprising determining a health of the system by monitoring the health of each of the plurality of components in the system.

7. A method as recited in claim 1, further comprising:
determining a performance of the system; and
determining whether the performance of the system satisfies a service level agreement associated with the system.

8. A method as recited in claim 1, further comprising suppressing error notices generated by a particular component if the particular component is not the cause of the error.

9. A computer implemented method comprising:
storing, in a memory, instructions for performing the method;
executing the instructions on a processor;
according to the instructions being executed:
identifying a plurality of components in a system, wherein each of the plurality of components is defined by a model that includes an associated plurality of pages of data associated with each component, the plurality of pages comprising:
an installation page;
a constraints page;
a monitoring page;
a service level agreement page, wherein the service level agreement page defines a service level agreement between a purchaser of the component and a party associated with the sale of the component; and
a description page;
identifying a plurality of monitors associated with, and configured to monitor, the plurality of components;
identifying a plurality of health models associated with the plurality of monitors;
determining relationships between the plurality of components, wherein determining relationships between the plurality of components comprises utilizing data contained within the plurality of pages;
generating a monitoring policy to monitor the system, the monitoring policy being derived at least in part from the plurality of health models and the relationships between the plurality of components;
monitoring a health associated with the system;
determining a performance of the system; and
determining whether the performance of the system satisfies a service level agreement associated with the system and whether each of the plurality of components satisfies its associated service level agreement.

10. A method as recited in claim 9, wherein each of the plurality of components is defined by a model that includes an associated page of data that defines an operation of the component.

11. A method as recited in claim 9, wherein monitoring a health associated with the system includes monitoring a health of each of the plurality of components in the system.

12. A method comprising:
establishing, by a computing device configured to provide model-based policy functionality, a plurality parts of a model of a system,
the establishing including associating, by the computing device, a type, an instance, and one or more configurations with components of the system, each type, instance, and configuration having its own information page corresponding to a particular component, wherein:
the type is a general template having a corresponding information page that describes the type to which the particular component corresponds;
the configuration is a specific template including specific information for a particular class of the type;
the instance is a specific occurrence of the type or the configuration and corresponds to the particular component;
information contained in an information page associated with the instance is more specific or restrictive than the information contained in an information page associated with the configuration, unless instructed otherwise by a user; and
information contained in the information page associated with the configuration is more specific or restrictive than the information contained in the information pages associated with the type, unless instructed otherwise by the user;
each respective information page includes one or more policies;
receiving, by the computing device, multiple policies for the model of the system;
for a first policy of the multiple policies:
identifying, by the computing device, a first part of the model of the system to which the first policy applies;
associating, by the computing device, the first policy with the identified first part of the model of the system; and invoking, by the computing device, a deployment agent to apply the first policy to components of the system corresponding to the identified first part of the model of the system; and for a second policy of the multiple policies:

identifying, by the computing device, a second part of the model of the system to which the second policy applies;

associating, by the computing device, the second policy with the identified second part of the model of the system; and invoking, by the computing device, the deployment agent to apply the second policy to components of the system corresponding to the identified second part of the model of the system, wherein:

the first policy is different from the second policy; and the first part of the model of the system is different from the second part of the model of the system.

* * * * *